United States Patent [19]
O'Hara

[11] 3,837,095
[45] Sept. 24, 1974

[54] PERCEPTUAL MEASURING APPARATUS AND METHOD

[75] Inventor: Eugene F. O'Hara, Chicago, Ill.

[73] Assignee: Management Programs, Inc., Glen Ellyn, Ill.

[22] Filed: July 20, 1973

[21] Appl. No.: 381,143

[52] U.S. Cl. .................. 35/22 R, 35/29 R, 273/1 R
[51] Int. Cl. .......................................... G09b 19/00
[58] Field of Search ........ 35/22 R, 29 R, 1; 273/1 R

[56] References Cited
FOREIGN PATENTS OR APPLICATIONS
| | | | |
|---|---|---|---|
| 134,818 | 2/1920 | Great Britain ...................... | 35/22 R |
| 134,820 | 2/1920 | Great Britain ...................... | 35/22 R |

OTHER PUBLICATIONS
Sears, Roebuck Catalog, Fall and Winter, 1963, Page 1085.

C. H. Stoelting Co. Catalog, 1930, Page 143, No. 31213, BF 431 S8.

*Primary Examiner*—Wm. H. Grieb
*Attorney, Agent, or Firm*—E. Manning Giles

[57] ABSTRACT

Apparatus for measuring a subject's sensory perception wherein a test board which is screenable from the subject's view is provided with two pairs of selectively spaceable sensor plates to be grasped by the subject's respective hands and procedure for manipulating such plates to ascertain the subject's sensory ability to match spacings between the respective pairs of sensor plates.

6 Claims, 3 Drawing Figures

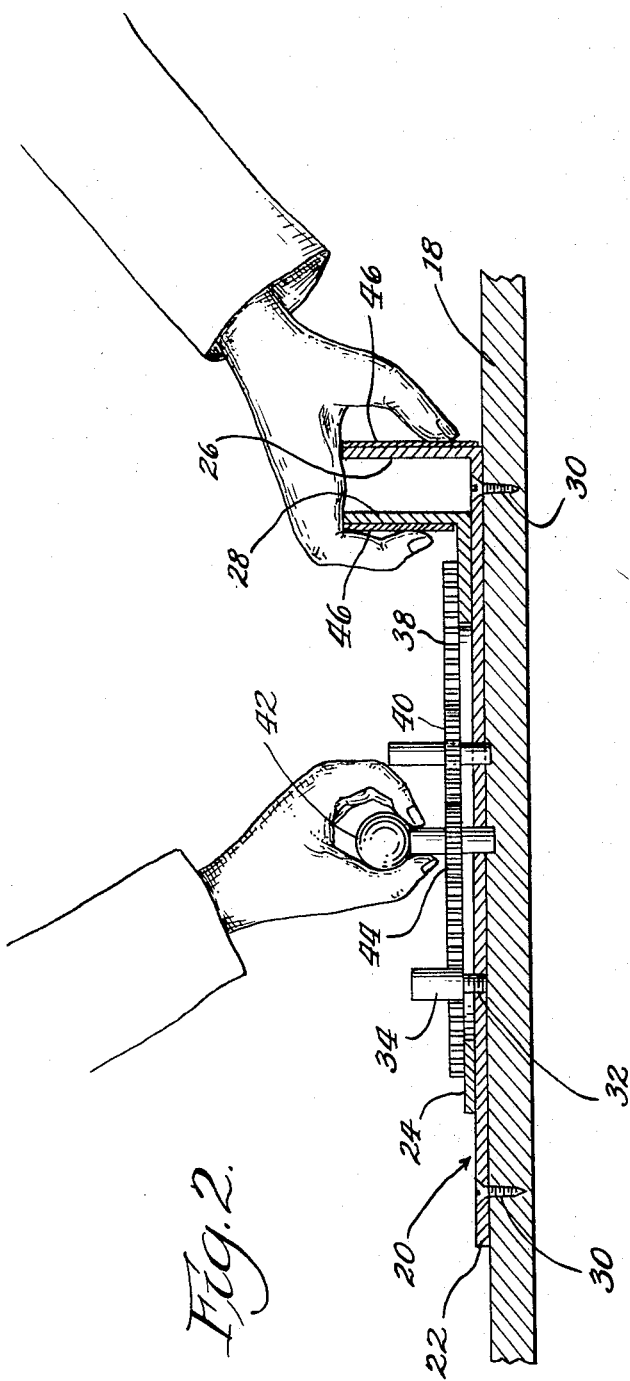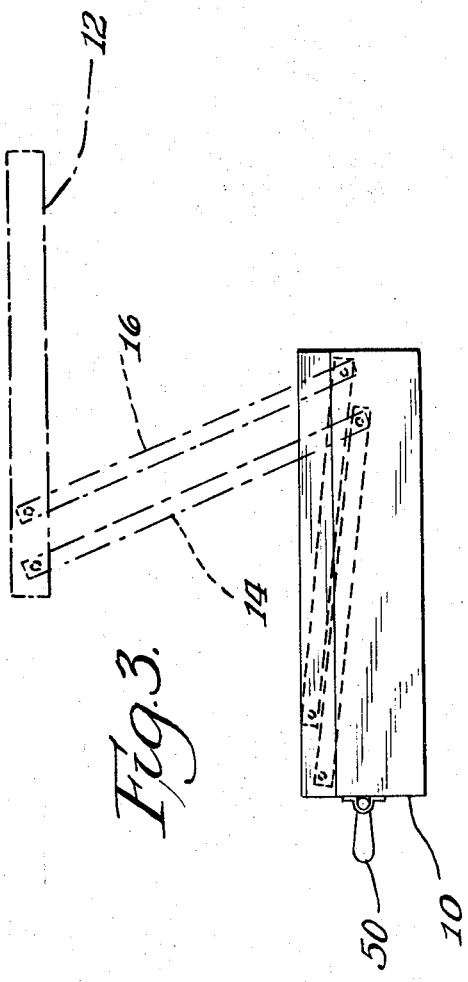

PERCEPTUAL MEASURING APPARATUS AND METHOD

BACKGROUND OF THE INVENTION

For many years, industrial psychologists, behavioral researchers, management consultants, personnel administrators, educators and others have sought reliable ways to predetermine the attitudes, propensities, predispositions and behavioral patterns of individuals being evaluated for one reason or another.

Various methods have been used for such personnel evaluation, including clinical questionnaires, aptitude and interest tests, intelligence and mental ability tests, reference checks with personal acquaintances and former employers, multiple interview procedures and problem solving assignments. Each of these has been found to have utility, but an experienced or skillful subject may often respond consciously or otherwise in such a way as to detract from the validity of the results. This has necessitated the use of various corrobative techniques in personnel testing and evaluation as a safeguard against the acknowledged fallibility of each of the generally known and used procedures and tests.

Various specialized tests have been developed and are used for determining specific aptitudes and skills through perceptual measurement and interpretation. Among these have been various manual procedures for measuring dexterity, physical reaction time, coordination and similar response characteristics. For example, the so-called "sand pile" test was a procedure wherein the subject was blindfolded and asked to touch a small mound of sand with the forefinger of his right hand. Then, he was asked to come as close as possible to touching the same spot with the corresponding finger of his left hand. The measurement thus obtained was regarded as indicative of a subject's tactile perception but it was not recognized as correlable with a subject's attitudes and propensities.

Utilizing the data and observations obtained through experience with earlier testing means and procedures, I have developed a more convenient, sophisticated and versatile apparatus and procedure for sensory perceptual measurement. Using this apparatus and procedure, I have conducted extensive tests on 200 or more subjects and have researched the correlation between their tactile perception and ascertainable attitudes and propensities. The evaluation of the data thus obtained enables a high level of precision in subject testing and, therefore, more reliable data recording and evaluation procedures.

SUMMARY OF THE INVENTION

In a preferred form, the instrument I have developed for the foregoing purposes resembles an attache case. The lid, instead of being hinged in the usual manner, is mounted so as to be raised in parallel relation to the body of the case. The body of the case contains a testing board which is exposed by raising the lid. On the board is a pair of manipulable sensor devices which are visible to the test administrator but screened from the view of the person being tested when the lid is in the raised position. Each manipulable sensor device has a pair of upstanding sensor plates which may be moved toward or away from each other and clamped in any selected spacing. In using the instrument, the test administrator clamps the sensor plates of one manipulable sensor device in a predetermined spacial relationship. He then causes the subject to grasp the respective sensor plates with one hand and the corresponding sensor plates of the other device with the other hand while he manipulates the device that has not been clamped. The subject is asked to say, without visual aid, when the plates of the latter device are spaced the same distance apart as those of the clamped device. By repeating this procedure several times under varying conditions, and recording the spacing error in each instance, data are obtained on the basis of which evaluations of the subject may be made.

BRIEF DESCRIPTION OF THE DRAWING

In the accompanying drawing, my invention is shown in a preferred form wherein:

FIG. 2 is a view on the line 2—2 of FIG. 1, showing the respective hands of a test administrator and a test subject; and FIG. 3 is a side view of my testing device shown in closed position and with broken lines showing the open position corresponding to FIG. 1.

DETAILED DESCRIPTION OF THE INVENTION

Figure 1:
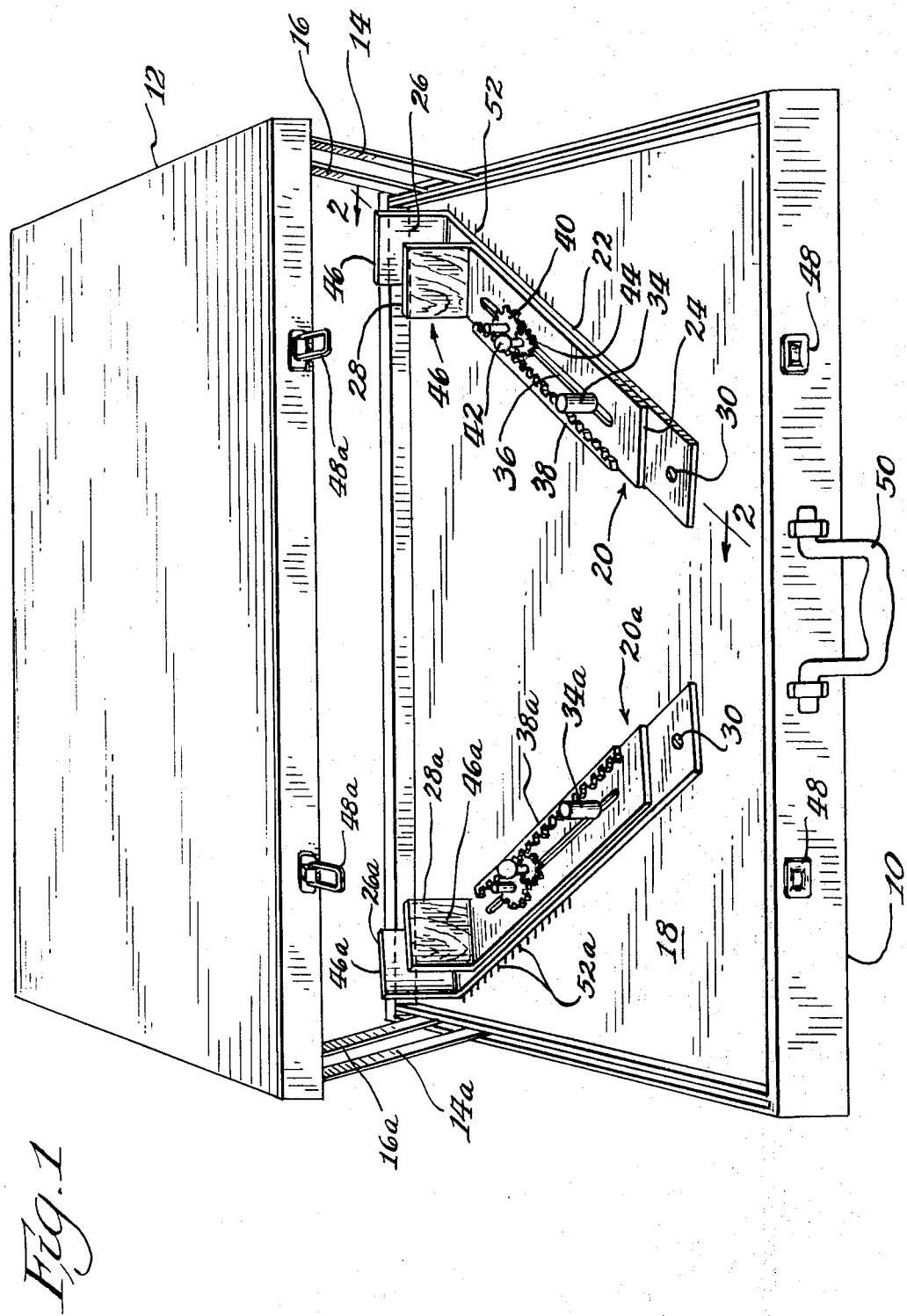
FIG. 1 is a perspective view of a testing device embodying my invention shown in the open position as it would be viewed by a test administrator.

Referring now to the drawing, the base portion of my testing device is indicated generally by the reference numeral 10. The base 10 is of generally rectangular, box-like shape similar to the bottom portion of an attache case. A lid 12 is provided which resembles a typical attache case lid but, instead of being hinged, is supported at each side by a pair of cantilever arms 14 and 16, and 14a and 16a which are secured to the base 10 and lid 12 as shown to maintain the lid 12 in parallel relation to the base 10 in both the open and closed positions and throughout its path of movement as the lid 12 is raised to the open position on lowered to the closed position.

A mounting board 18 or similar planar member is provided in the base 10 and a pair of substantially identical adjustable sensor devices 20 and 20a are disposed on said mounting board 18, preferably at an angle as shown for convenient operation both by the test administrator and manual contact by the test subject with the sensor plates.

The adjustable sensor device 20 consists of a fixed member 22 and a cooperating movable member 24 reciprocably engaged thereon, said fixed member 22 comprising an elongated flat body portion with an upstanding sensor plate 26 at the end adapted to be positioned toward the test subject, and said movable member 24 comprising a similar elongated flat body portion disposed thereon. Said movable member 24 is of reduced length in relation to said fixed member 22, is aligned therewith and longitudinally reciprocable thereon. At the end adjacent the upstanding plate 26, the movable member 24 is provided with corresponding upstanding sensor plate 28.

Fixed member 22 may be secured to the mounting board 18 by means of screws 30 or other suitable means and is provided with threaded hole 32 in which a clamping knob 34 with a threaded extension is threadably engaged. Movable member 24 is provided with a lengthwise slot 36 extending most of the length thereof, said slot 36 being wider than and adapted to straddle the threaded extension of the knob 34. The knob 34 projects above and is wider than the slot 36 and may be rotated clockwise so as to be tightened against the movable member 24 at the respective sides of the slot 36, thus clamping the movable member 24 against movement in either direction in relation to the fixed member 22. By turning the knob 34 in a counterclockwise direction, it is loosened so that the movable member 24 is freely slidable longitudinally on the fixed member 22, thus causing vertical plate 28 to be moved toward or away from vertical plate 26.

The movable member 24 is provided with a rack gear 38 adjacent to and parallel with the slot 36. The rack gear 38 is engaged by an intermediate pinion 40 which has an axial portion projecting through the slot 36 and rotatably engaged in the fixed member 22. A manipulation knob 42 with a corresponding axial portion projecting through slot 36 is located adjacent the intermediate pinion 40 and rotatably engaged in the fixed member 22. The manipulation knob 42 is provided with circumferential gear teeth 44 which engage the intermediate pinion 40. When the knob 42 is rotated, it causes the intermediate pinion 40 to be rotated. The intermediate pinion 40 by virtue of its engagement with rack gear 38, causes the movable member 24 to move one way or the other with respect to the fixed member 22 on which it is mounted.

Preferably, a layer of wood veneer 46 is applied to the outer faces of the respective upstanding sensor plates 26 and 28 so that the test subject's fingers and thumbs will touch wood rather than metal during the test procedures. This is desirable because manual perceptivity is better for most people when the fingers are in contact with wood rather than metal and it is important to the test contemplated herein that the test subject's fingers have maximum sensory perception at the time the tests are administered.

The lid 12 may be provided with cooperating latch members 48 and 48a, as shown, on the base 10 and lid 12, respectively, to permit locking the apparatus in the closed position when not in use. Likewise, a handle 50 may be provided to enable carrying the apparatus in the manner of an attache case.

Calibration markings 52 may be placed along one side of fixed member 22 so that the precise spacing between vertical plates 26 and 28 can be noted more conveniently by the test administrator. Corresponding calibration markings 52a are placed along side the manipulation device 20a.

When it is desired to conduct a test or a series of tests with my test apparatus, the test administrator places the base 10 on a desk or table and opens the lid 12 in the manner shown in FIG. 1 so that the test administrator views the apparatus as seen in FIG. 1. The test subject is seated at the opposite side of the apparatus so that the raised lid 12 blocks his view of the mounting board 18. The test subject should not be able to see either of the adjustable sensor devices 20 or 20a. The test administrator loosens knob 34 and turns the manipulation knob 42 as shown in FIG. 2 to move the movable member 24 to a position in which some selected spacing exists between the respective sensor plates 26 and 28. The knob 34 is then tightened to clamp the movable member 24 in that position. The test subject is asked to grasp the wood veneer surfaces 46 on the cooperating sensor plates 26 and 28 between the thumb and forefinger of his left hand, as shown in FIG. 2. He then grasps wood veneer surfaces 46a of the corresponding sensor plates 26a and 28a of sensor device 20a between the thumb and forefinger of his right hand. The test administrator then sets one pair of sensor plates, such as 26a–28a, in a pre-determined position by tightening and clamping knob 34a. He them turns the manipulation knob 42 on the sensor device 20 to cause the sensor plates 26–28 to separate and asks the subject to state when he senses that the spacing therebetween is the same as the spacing between sensor plates 26a and 28a. The subject makes this determination relying entirely on his sense of touch or manual perception. The test administrator then checks the spacing as shown on scale 52, noting whether the spacing is less or more than that of the sensor plates 26a and 28a. The precise numerical difference is recorded. The same test may be repeated several times, and then conducted several times with the other hand. A preferred test procedure involves a further repetition of the same tests, in each case preceded with a "sensitizing" of the thumb and forefinger of the hand to be tested by rubbing them back and forth against the wood surfaces 46 of the sensor plates 26 and 28 or the corresponding portions of the device 20a. Further tests may be made using variations of those previously described, as the trained test administrator considers appropriate. All of the test results are then recorded. These are compared with previously collected data and interpreted accordingly. An experienced operator should be sufficiently familiar with the various applicable criteria to be able to make accurate evaluations without reference to such data.

My testing apparatus and method utilize various facets of human sensory perception and the correlation between an individual's processing of sensory input and his attitudes, activities, propensities, predispositions, and behavior. By setting up the adjustable sensor device 20 or the corresponding device 20a and having the subject make a series of spacing determinations solely through sensory perception, the test administrator can ascertain a great deal about how sensory signals communicated through the nervous system are processed in the test subject's brain. After a series of tests, the experienced test administrator can judge whether the hemispheres of the subject's brain tend to duplicate each other or to what extent they may be unsynchronized.

A skilled test administrator may modify the procedure in various ways to obtain data on how a particular test subject perceives, processes and responds to sensory data. Likewise the test apparatus itself may be modified in various ways to provide varying sensory stimuli and to utilize other means for operating the sensory devices without departing from the basic conceptions contemplated in my invention, the scope of which is to be determined by the appended claims.

I claim as my invention:

1. An apparatus for measuring a test subject's tactile perceptual responses comprising a base, a first pair of cooperating, upstanding sensors mounted thereon, one of said sensors being manually manipulable to adjust the spacing thereof from the other of said sensors, and a corresponding second pair of cooperating sensors mounted on said base and spaced from said first pair of sensors, said base being provided with a visibility shield in superposed relation to said pairs of sensors and said shield being attached to said base by means enabling interposition of said shield in the visual path between the eyes of a test subject and said first and second pairs of sensors.

2. The apparatus of claim 1 wherein each pair of sensors is provided with adjusting means for moving its manually manipulable sensor through a range of spacings with respect to the other of said sensors and with clamping means for securing said manually manipulable sensor in any selected position within said range of spacings.

3. The apparatus of claim 2 in which each sensor is provided with a relatively flat surface on the side away from the sensor with which it is paired and in generally perpendicular relation to said base, the relatively flat surfaces of each cooperating pair of sensors being maintained in substantially parallel relation throughout said range of spacings.

4. The apparatus of claim 3 wherein each of said relatively flat surfaces is provided with a layer of fibrous material for tactile contact.

5. The apparatus of claim 4 wherein said visibility shield is retractable from interposition in said visual path to engagement in lid-like relation on said base.

6. The method of measuring a test subject's tactile responses comprising the steps of causing such person to grasp each of two pairs of spaced sensors between the thumb and a finger of each of his respective hands, obstructing such subject's view of said sensors, clamping one of said pairs of sensors in fixed space relationship, manipulating the spacing of the other pair of sensors, and noting when such subject perceives tactilely that the space relationship between the manipulated sensors is the same as the space relationship between the clamped sensors.

* * * * *